US011527104B2

(12) United States Patent
Rittman et al.

(10) Patent No.: US 11,527,104 B2
(45) Date of Patent: Dec. 13, 2022

(54) SYSTEMS AND METHODS OF FACIAL AND BODY RECOGNITION, IDENTIFICATION AND ANALYSIS

(71) Applicants: Danny Rittman, San Diego, CA (US); Mo Jacob, Beverly Hills, CA (US)

(72) Inventors: Danny Rittman, San Diego, CA (US); Mo Jacob, Beverly Hills, CA (US)

( * ) Notice: Subject to any disclaimer, the term of this patent is extended or adjusted under 35 U.S.C. 154(b) by 0 days.

(21) Appl. No.: 17/212,235

(22) Filed: Mar. 25, 2021

(65) Prior Publication Data

US 2022/0253628 A1 Aug. 11, 2022

Related U.S. Application Data

(60) Provisional application No. 63/147,326, filed on Feb. 9, 2021.

(51) Int. Cl.
*G06T 17/20* (2006.01)
*G06V 40/16* (2022.01)
(Continued)

(52) U.S. Cl.
CPC ............ *G06V 40/165* (2022.01); *G06F 21/32* (2013.01); *G06T 7/50* (2017.01); *G06T 7/60* (2013.01);
(Continued)

(58) Field of Classification Search
CPC .... G06V 40/165; G06V 40/172; G06V 40/10; G06V 40/50; G06T 7/50; G06T 7/60;
(Continued)

(56) References Cited

U.S. PATENT DOCUMENTS 10,410,076 B2    9/2019  Van Os et al.
10,872,256 B2   12/2020  Van Os et al.
(Continued)

FOREIGN PATENT DOCUMENTS

KR       10-1998112 B1      2/2019
WO    WO2021/232049    *  5/2021   .............. F06F 30/00

OTHER PUBLICATIONS

Lauren Goode iPhone's Face ID Will Soon Work With a Mask if You Have an Apple Watch, Wired Feb. 2, 2021 downloaded May 12, 2021 https://www.wired.com/story/iphone-face-id-mask-ios-beta/.
(Continued)

*Primary Examiner* — Jin Ge
(74) *Attorney, Agent, or Firm* — Eric L. Lane; Green Patent Law

(57) ABSTRACT

Systems and methods for learning and recognizing features of an image are provided. A point detector identifies points in an image where there are two-dimensional changes. A geometric feature evaluator overlays at least one mesh on the image and analyzes geometric features on the at least one mesh. An internal calibrator transforms data from the point detector and the geometric feature evaluator into a three-dimensional point figure of the image, and a depth evaluator determines a final shape of the image. A three-dimensional object model of the image is constructed. The image could be a human face or body. Exemplary systems and methods can construct and learn features of a human face based on a partial view where part of the face is covered. Systems and methods can unlock a mobile device based on recognition of the features of the user's face.

15 Claims, 20 Drawing Sheets

(51) Int. Cl.
*G06T 7/60* (2017.01)
*G06T 7/50* (2017.01)
*G06F 21/32* (2013.01)
*G06V 40/10* (2022.01)
*G06V 40/50* (2022.01)

(52) U.S. Cl.
CPC .............. *G06T 17/20* (2013.01); *G06V 40/10* (2022.01); *G06V 40/172* (2022.01); *G06V 40/50* (2022.01); *G06T 2207/10012* (2013.01); *G06T 2207/20081* (2013.01); *G06T 2207/20084* (2013.01); *G06T 2207/20164* (2013.01); *G06T 2207/30201* (2013.01)

(58) Field of Classification Search
CPC ........... G06T 17/20; G06T 2207/10012; G06T 2207/20081; G06T 2207/20084; G06T 2207/20164; G06T 2207/30201; G06F 21/32
USPC ....................................................... 345/420
See application file for complete search history.

(56) References Cited

U.S. PATENT DOCUMENTS

| | | | |
|---|---|---|---|
| 2009/0245624 A1* | 10/2009 | Hamanaka | G06V 40/172 |
| | | | 382/209 |
| 2017/0032179 A1 | 2/2017 | Al-Qunaieer et al. | |
| 2018/0276454 A1* | 9/2018 | Han | G06V 40/171 |
| 2018/0285630 A1* | 10/2018 | Han | G06V 10/454 |
| 2018/0373924 A1* | 12/2018 | Yoo | G06K 9/6262 |
| 2020/0082157 A1* | 3/2020 | Susskind | G06V 40/171 |
| 2020/0210685 A1* | 7/2020 | Ko | G06V 40/171 |
| 2020/0394288 A1 | 12/2020 | Milne et al. | |
| 2021/0042549 A1 | 2/2021 | Van Os et al. | |
| 2021/0173916 A1* | 6/2021 | Ortiz | H04L 9/3226 |

OTHER PUBLICATIONS

Samantha Kelly Apple tests new way to unlock iPhone w/o removing face mask CNN Feb. 2, 2021 downloaded May 12, 2021 https://www.cnn.com/2021/02/02/tech/apple-face-id-mask/index.html.

* cited by examiner

SYSTEMS AND METHODS OF FACIAL AND BODY RECOGNITION, IDENTIFICATION AND ANALYSIS

CROSS-REFERENCE TO RELATED APPLICATION

This application claims priority to U.S. Patent Application Ser. No. 63/147,326, filed Feb. 9, 2021, which is hereby incorporated by reference herein in its entirety.

FIELD

The present disclosure relates to systems and methods for learning and recognizing features of an image such as a human face and unlocking functions for any computer or smartphone screen based on facial and body recognition, including covered face or body.

BACKGROUND

Many mobile devices such as smartphones include a facial identification (ID) recognition system that learns the user's facial features and unlocks the phone upon its user's face image. Due to the COVID-10 pandemic, in most public places a face cover or facemask is required. However, the presence of a face cover or mask interrupts the face recognition unlocking feature on most mobile devices.

Accordingly, there is a need for a system and method that can learn and recognize a partially covered human face. There is a need for a system and method that can unlock a mobile device based on recognition of a partially covered human face.

SUMMARY

The present disclosure, in its many embodiments, alleviates to a great extent the disadvantages of known devices, systems, and methods by providing an AI-based computer vision system and method to lock and unlock a mobile device such as a smartphone with or without face (mask) coverage. The user trains the system once without a face cover (mask). After the initial training, the system is capable of identifying the user's facial features with or without a face cover or facemask and is capable of locking or unlocking it. In addition, the system can be trained once for the user's body's features. After learning the user's body's features, the system can monitor bodily changes like weight gain and other changes, alerting the user in real time.

Exemplary embodiments of a system for learning and recognizing features of an image comprise at least one point detector, at least one geometric feature evaluator, at least one internal calibrator, and at least one depth evaluator. The point detector identifies points in an image where there are two-dimensional changes. The geometric feature evaluator overlays at least one mesh on the image and analyzes geometric features on the at least one mesh. The internal calibrator transforms data from the point detector and the geometric feature evaluator into a three-dimensional point figure of the image. The depth evaluator determines a final shape of the image.

In exemplary embodiments, the point detector and the geometric feature evaluator identify points based on geodesic distance between vertices in the mesh. The geometric feature evaluator may use stereo vision to perform its tasks. The two-dimensional changes may comprise one or more of: corners, junctions, and vertices. In exemplary embodiments, the system constructs a three-dimensional object model of the image. The system is capable of constructing a three-dimensional object model of the image from a partial view of the image.

In exemplary embodiments, the image is of a human face or body. The system may further comprise an artificial intelligence unit configured to learn a user's facial and body features. In exemplary embodiments, the system is housed in a mobile device and is configured to lock or unlock the mobile device upon identification of the user's facial or body features. The system may further comprise a neural network. Exemplary embodiments include an expert system configured to read data from the neural network and identify unique features of a user's face or body and map the unique features into a database. The expert system computes physical relations and ratios of unique facial and body features including and not limited to distance and depth.

Exemplary computer-implemented methods of learning and recognizing features of an image comprise identifying points in an image where there are two-dimensional changes, overlaying at least one mesh on the image and analyzing geometric features on the at least one mesh, transforming data relating to the points and geometric features into a three-dimensional point figure of the image, and determining a final shape of the image. The points may be identified based on geodesic distance between vertices in the mesh. The two-dimensional changes comprise one or more of: corners, junctions, and vertices. The geometric features may be analyzed using stereo vision. Exemplary methods further comprise constructing a three-dimensional object model of the image.

In exemplary embodiments, the image is of a human face or body and methods further comprise learning features of a user's face or body. Exemplary methods comprise identifying the features of the human face and unlocking a mobile device based on recognition of the features of the user's face. In exemplary embodiments the constructing step is performed based on a partial view of the image and the learning is performed based on a partial view of the user's face. The recognition and unlocking may be performed based on a partial view of the features of the user's face. Exemplary methods further comprise storing as a reference data relating to the features of the user's face.

Accordingly, it is seen that systems and methods of learning and recognizing features of an image are provided. These and other features of the disclosed embodiments will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure.

As used herein, the "present disclosure" refers to any one of the embodiments described herein, and any equivalents. Furthermore, reference to various aspects of the disclosure throughout this document does not mean that all claimed embodiments or methods must include the referenced aspects. Reference to materials, configurations, directions, and other parameters should be considered as representative and illustrative of the capabilities of exemplary embodiments, and embodiments can operate with a wide variety of such parameters. It should be noted that the figures do not show every piece of equipment, nor the materials, configurations, and directions of the various circuits and communications systems.

In the present disclosure and its embodiments systems are provided including a mobile application and computer software. Exemplary embodiments learn a user's facial and body features by one-time user training. The user places the smartphone or other mobile device in front of his or her face and body, and the system learns the facial and body features. Based on this information, even if the user covers his or her face with a face mask, or any other type of cloth or covering, the system can identify him or her even with the face cover partially obscuring the face.

The same applies to the user's body features. The computer vision software learns the user's facial and body features once. Then it can identify the user's face or body features when they are fully covered with or without clothing and face cover. The system can identify a user's facial and body's changes, like weight gain or similar changes, alerting the user in real time. This feature can be used for device LOCK/UNLOCK, health watcher, clothing estimation and similar applications.

In exemplary embodiments, a fast and robust system detects, identifies and localizes human body parts within a software application. The information can be used as pre-processing for facial and body ID recognition and LOCKING/UNLOCKING algorithms. Disclosed embodiments can be used for smartphone and computer security LOCK/UNLOCK features based on facial and/or full-body features. They also can be used for tracking or surveillance.

Figure 1:
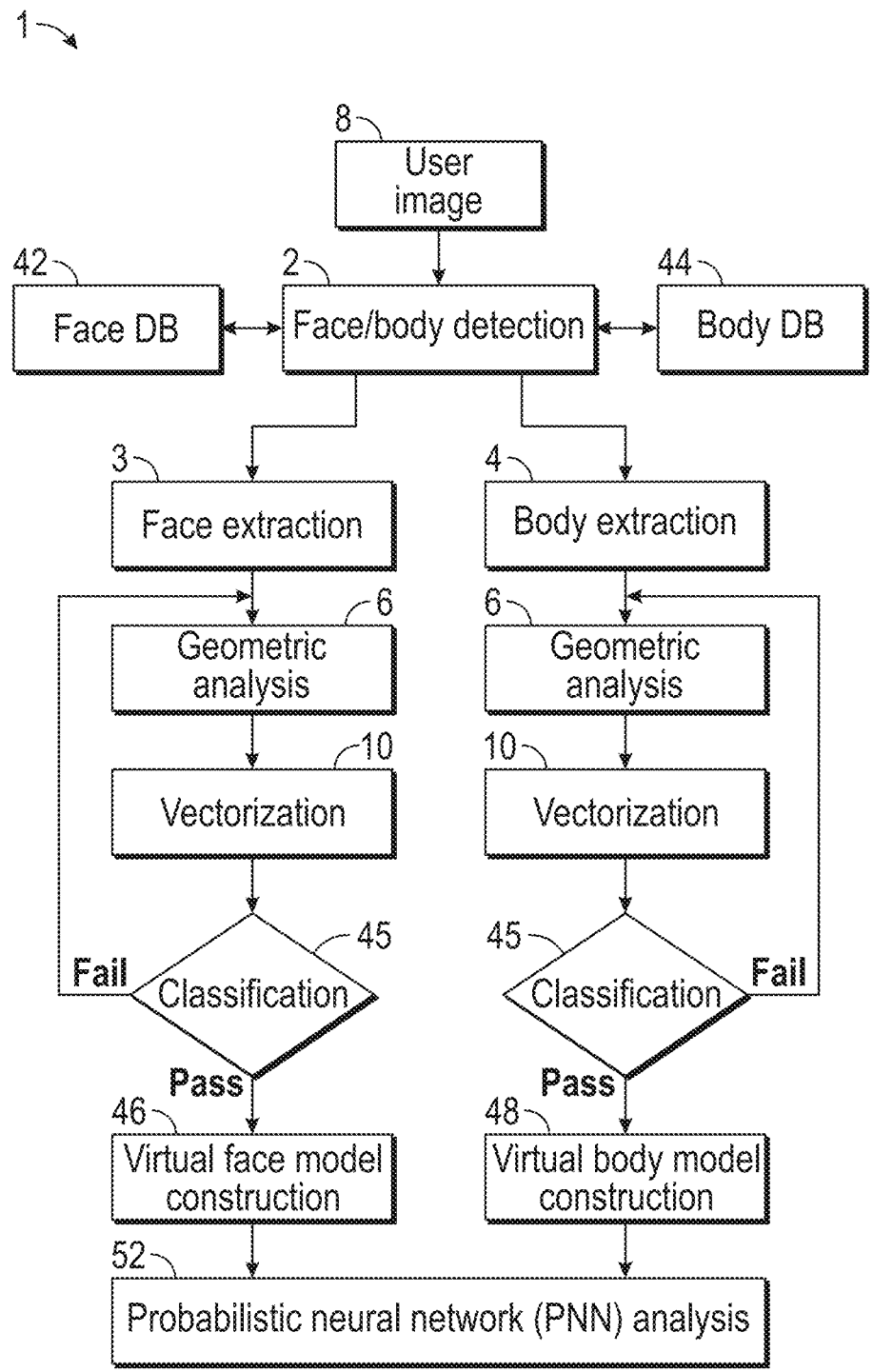
FIG. 1 is a process flow diagram of an exemplary embodiment of a system and method for learning and recognizing features of an image in accordance with the present disclosure.
Figure 2:
FIG. 2 is a front view of an exemplary embodiment of a system and method for learning and recognizing features of an image in accordance with the present disclosure.
Figure 2:
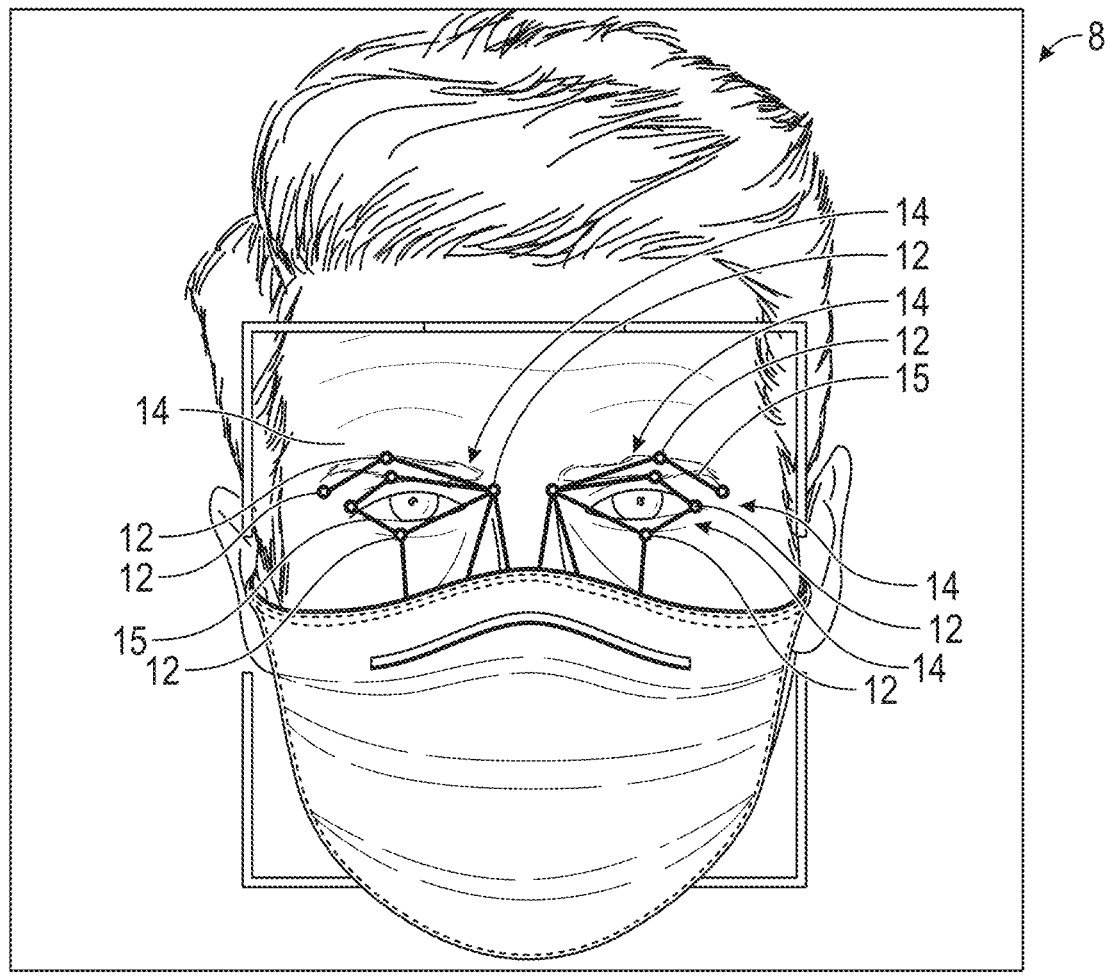
Figure 3:
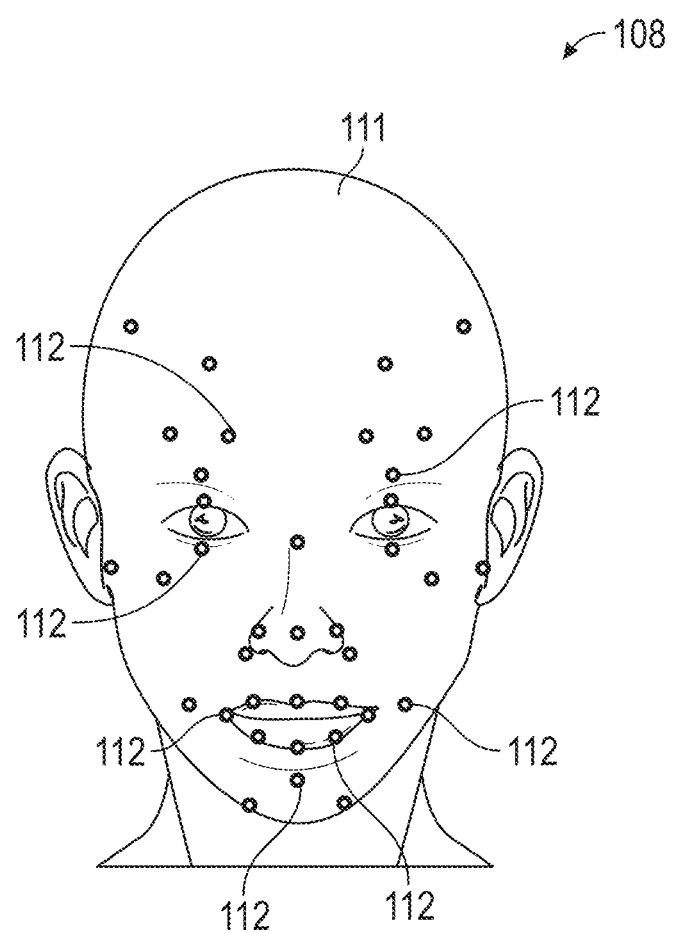
FIG. 3 is a schematic of an exemplary embodiment of a system and method for learning and recognizing features of an image using a neural network for facial mapping in accordance with the present disclosure.

Referring to FIGS. 1-3, an exemplary system 1 for learning and recognizing features of an image is illustrated. A detection and identification feature 2 performs face extraction 3 and body extraction 4 by finding specific, predefined points in the image 8 and computing descriptors for the local features around them. More particularly, one or more point detectors 10 identify points 12 in an image where there are two-dimensional changes 14. These point detectors 10 identify points in the image for which the signal changes two-dimensionally, e.g., at corners, junctions, and vertices. This method applies for facial and body parts.

In addition, computer vision features are applied directly to the given three-dimensional data to develop detectors for locally interesting points 112. Exemplary embodiments apply vision-based interest point detectors 10 on depth images 108 to construct 3D object models 111 in an unsupervised fashion from partial views. The imaging produces colored areas of interest to identify the location of the face and body features using computer vision techniques known in the art. Exemplary embodiments perform virtual face model construction 46 and virtual body model construction 48 when classification 45 of the face and body features are successful.

Figure 4:
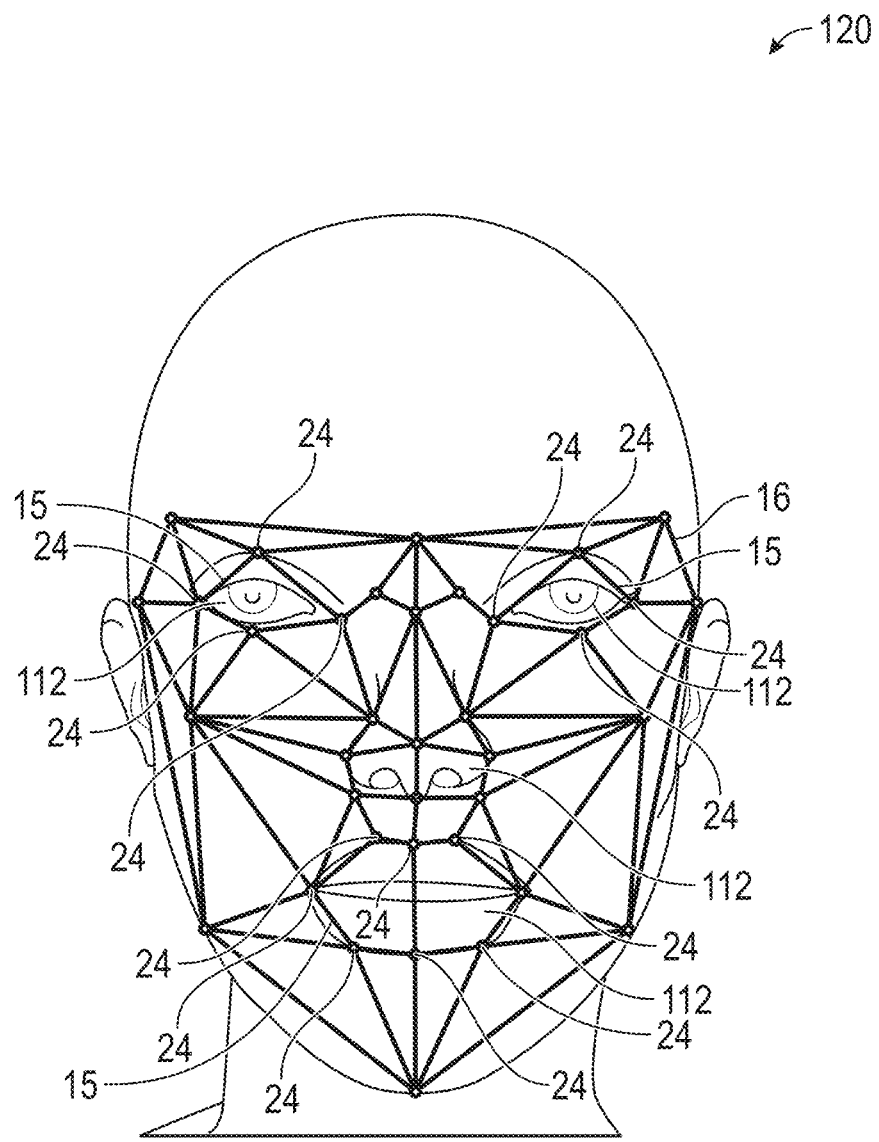
FIG. 4 is a schematic of an exemplary embodiment of a system and method for learning and recognizing features of an image by generating a three-dimensional point figure in accordance with the present disclosure.
Figure 5:
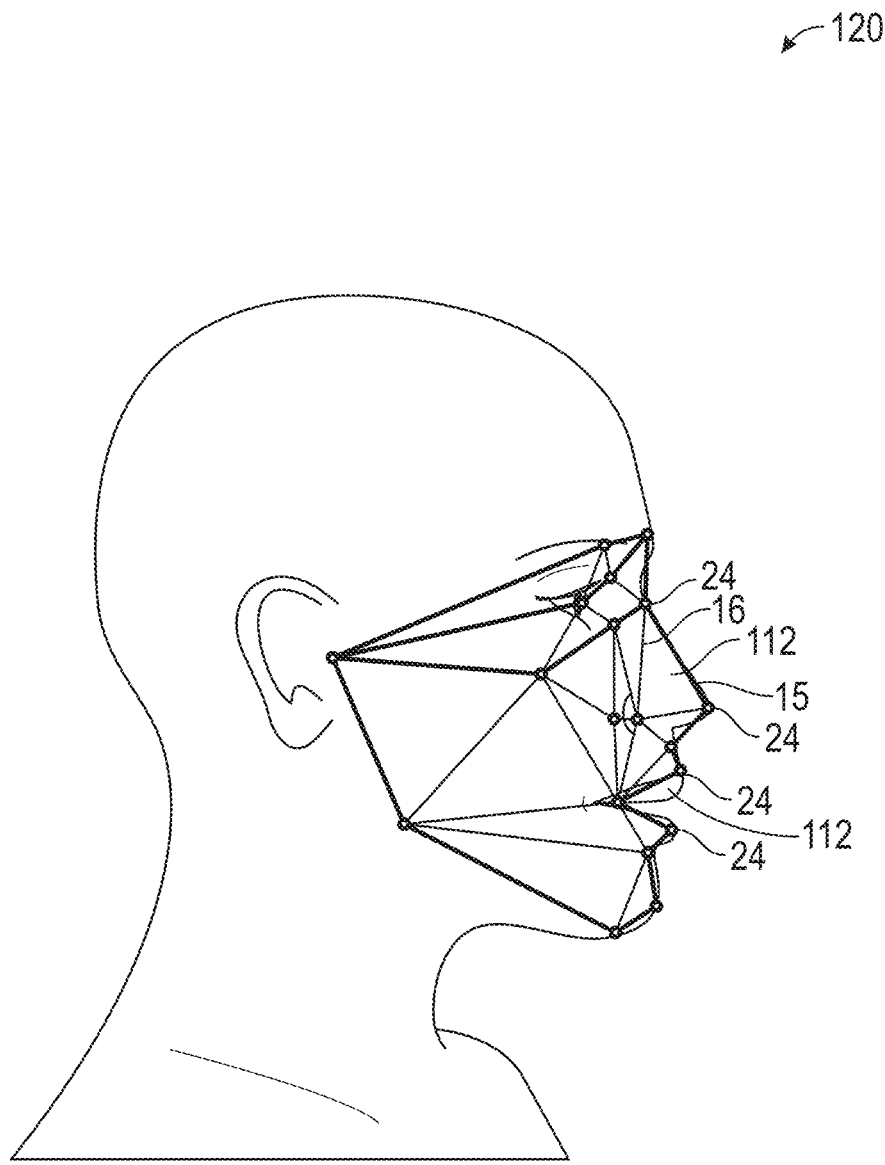
FIG. 5 is a side view of the embodiment shown in FIG. 4.

Turning also to FIGS. 4 and 5, another feature considers spectral geometric features on triangular meshes 16 and recognizes pointing gestures using stereotypical vision. In exemplary embodiments, one or more geometric feature evaluators 6 overlay at least one mesh 16 on the image 8 and analyze geometric features 15 on the at least one mesh. Exemplary embodiments identify points of interest 12 based on geodesic distance between vertices 24 in a mesh 16.

Figure 20A:
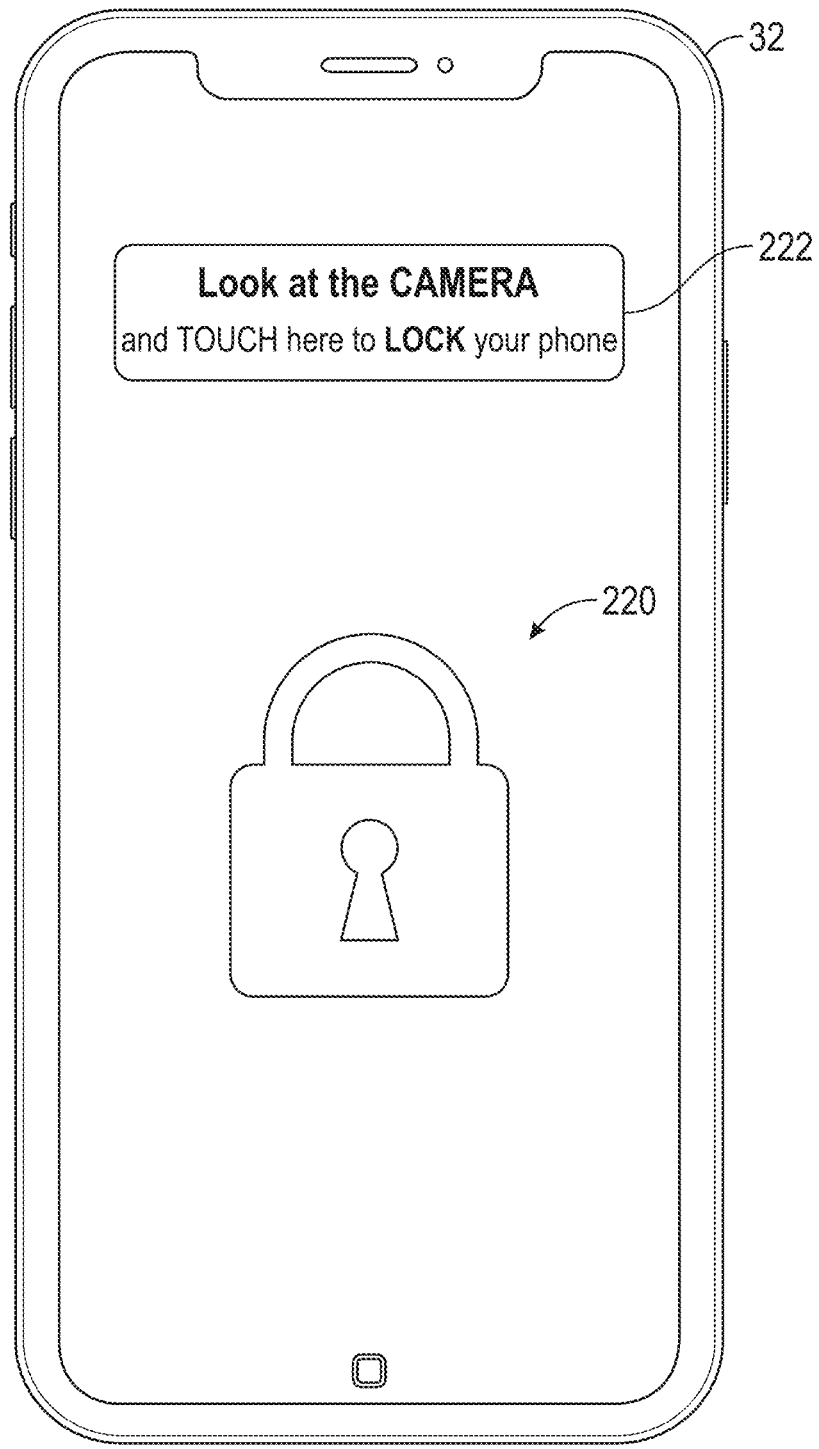
FIG. 20A is a front view of an exemplary embodiment of a mobile device LOCK/UNLOCK feature in accordance with the present disclosure.
Figure 20B:
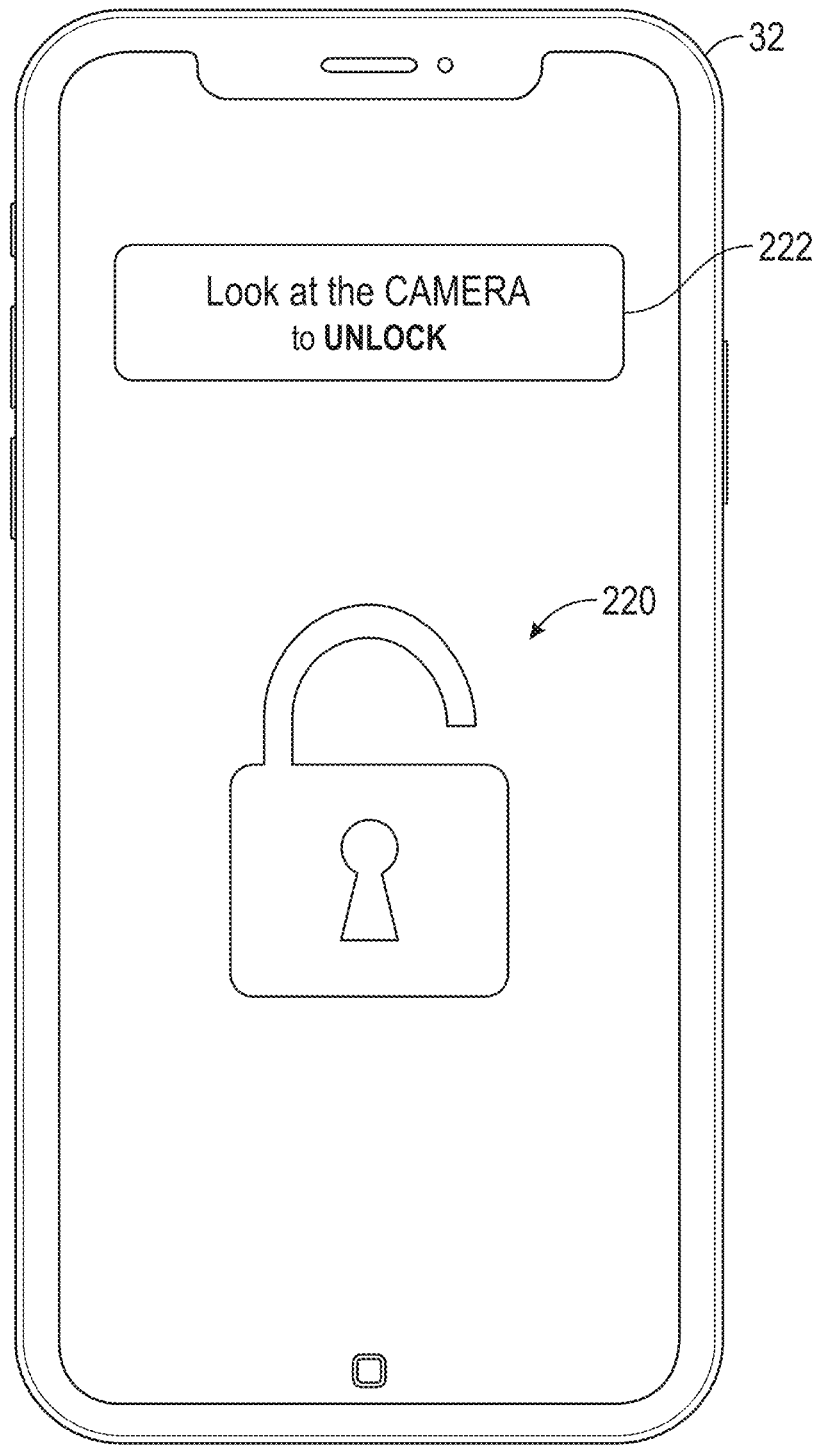
FIG. 20B is a front view of an exemplary embodiment of a mobile device LOCK/UNLOCK feature in accordance with the present disclosure.

This analysis for the points of interest detector has the advantage of providing a stable estimate of a person's shape and pose, which can be used to digitize his or her image 8, 108 prior to a figure's construction. Based on these features, exemplary systems and methods further categorize a person's features and are able to digitally "remove" facial and body covers, reconstructing the person's face and body for identification. As discussed in more detail herein, upon reconstruction of a person's features a LOCK/UNLOCK feature can be activated which is a straightforward method. The LOCK/LOCK feature 220 is shown in FIGS. 20A and 20B.

Figure 13:
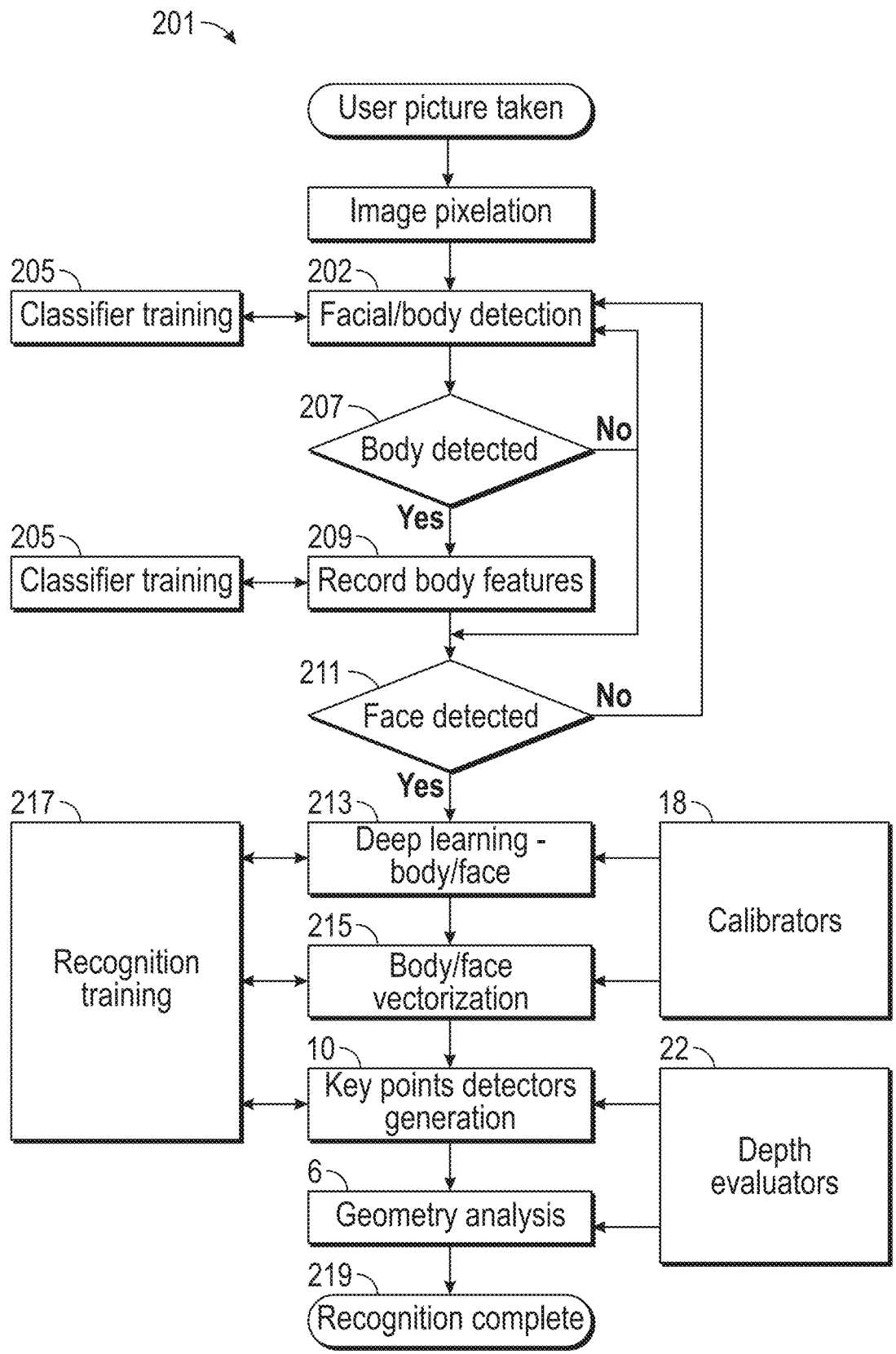
FIG. 13 is a process flow diagram of an exemplary embodiment of a method of learning and recognizing features of an image using pixelation and AI-based computer vision analysis in accordance with the present disclosure.

Distance measurements are transformed into a 3D point FIG. 120 using an internal calibration feature. More particularly, one or more internal calibrators 18 transform data from the point detectors 10 and the geometric feature evaluators 6 into a three-dimensional point FIG. 120 of the image 8, 108. One or more depth evaluators 22 determine the final shape of the image 8, 108. The roles of point detectors 10, calibrators 18, and depth evaluators 22 are best seen in FIG. 13.

Exemplary embodiments may include one or more of the following features. The system may include an artificial intelligence system 50 to learn the user's facial and body features, including but not limited to, skull size, distance between the eyes, and bone structure. In addition, exemplary systems and methods can learn the user's body's features like skeleton shape, body size, special and personal features. After the training, the system can identify the user's body and/or facial features for the purpose of locking or unlocking a smartphone, personal computer, and other apparatus.

Exemplary implementations of the described techniques may include hardware, a method or process, or computer software on a computer-accessible medium. Disclosed systems and methods may also include mobile application software and hardware. For security purposes the user still has the option to enter a passcode to unlock his or her mobile device. Exemplary embodiments include a processor for executing instructions and a memory for storing executable instructions. The processor executes the instructions to perform various functions. Another medium is a smartphone application to store and process the data for a wide variety of purposes. In exemplary embodiments, the smartphone application communicates with a backend program that runs on a computer server to learn, store, and process the data.

Figure 6:
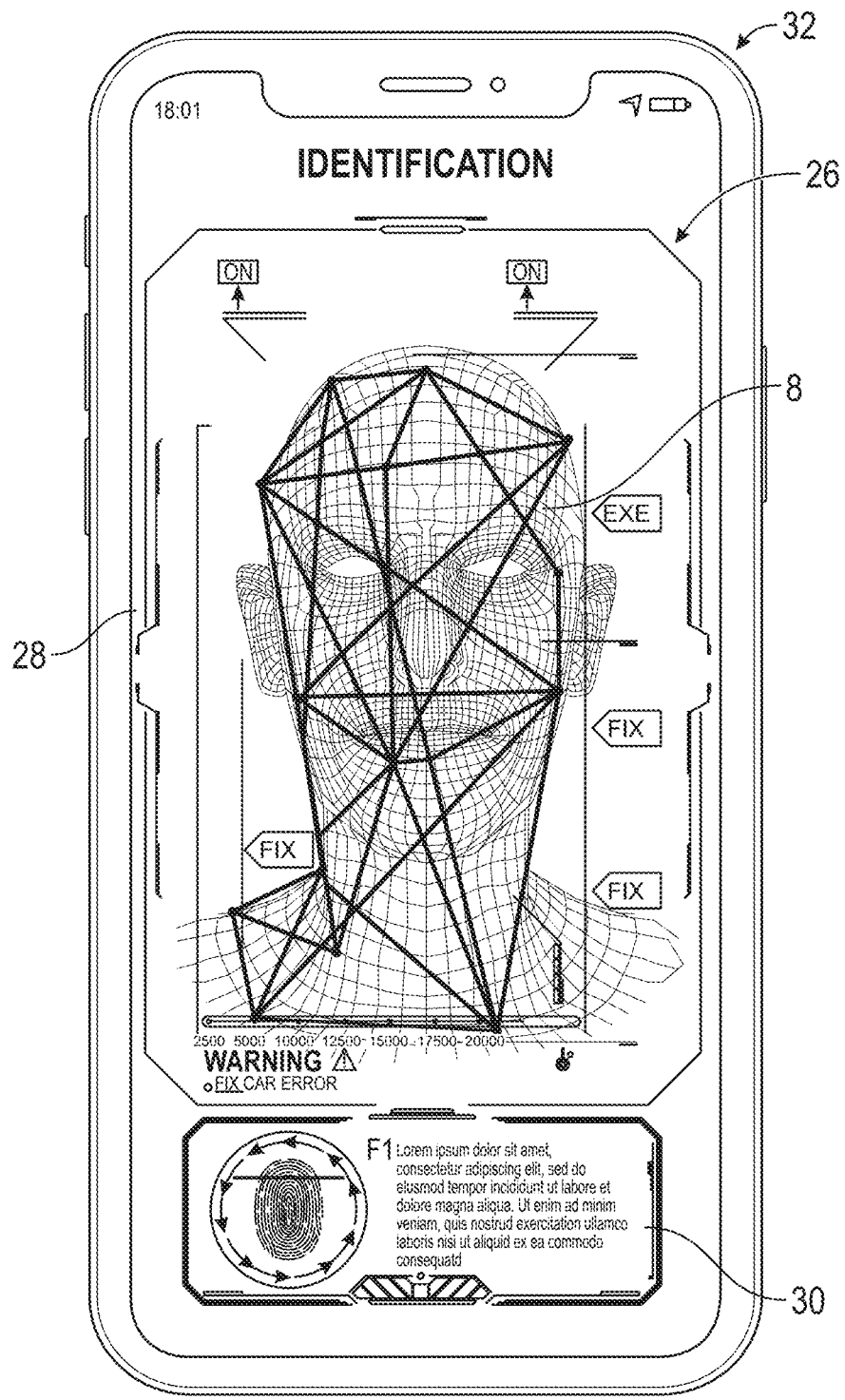
FIG. 6 is a process flow diagram of an exemplary embodiment of a display and graphical user interface in accordance with the present disclosure.

As shown in FIG. 6, in exemplary embodiments, a display 26 on a graphical user interface (GUI) 28 comprises an input interface 30 that receives a user-selected file having at least one image 8. An artificial intelligence system 50 receives the user's facial and body imaging content. In exemplary embodiments, the systems analyze the content according to the user's personal facial and body features and convert, on-demand, the user-selected content into an internal digital data file by combining the pre-learned user's facial and body information and additional, required features like LOCK/UNLOCK features, shown in FIGS. 20A and 20B. The system performs a user's facial and body study and recognition that is stored as a reference in a face database 42 and body database 44, respectively, shown in FIG. 1.

Figure 7:
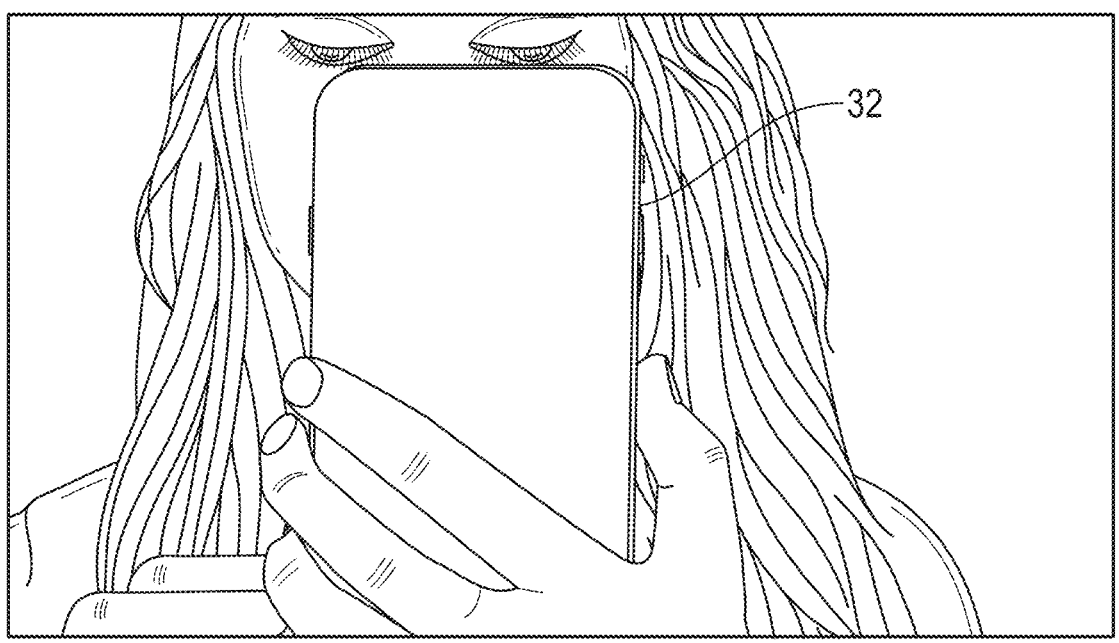
FIG. 7 is a perspective view of an exemplary embodiment of a method of learning and recognizing features of an image of a user's face in accordance with the present disclosure.
Figure 8:
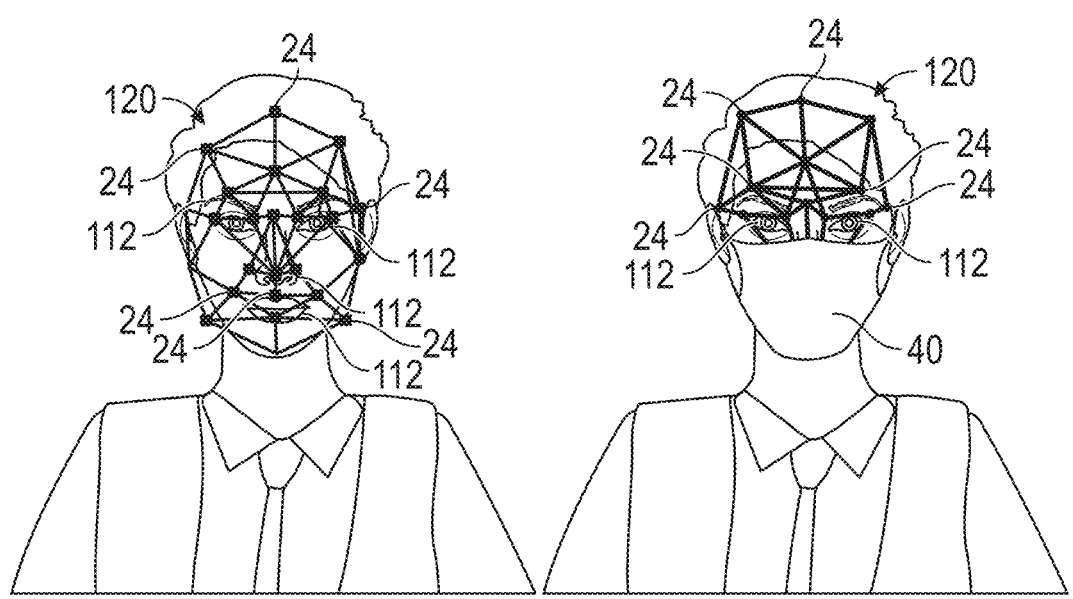
FIG. 8 is a schematic of an exemplary embodiment of a method of learning and recognizing features of an image of a user's face in accordance with the present disclosure.
Figure 9:
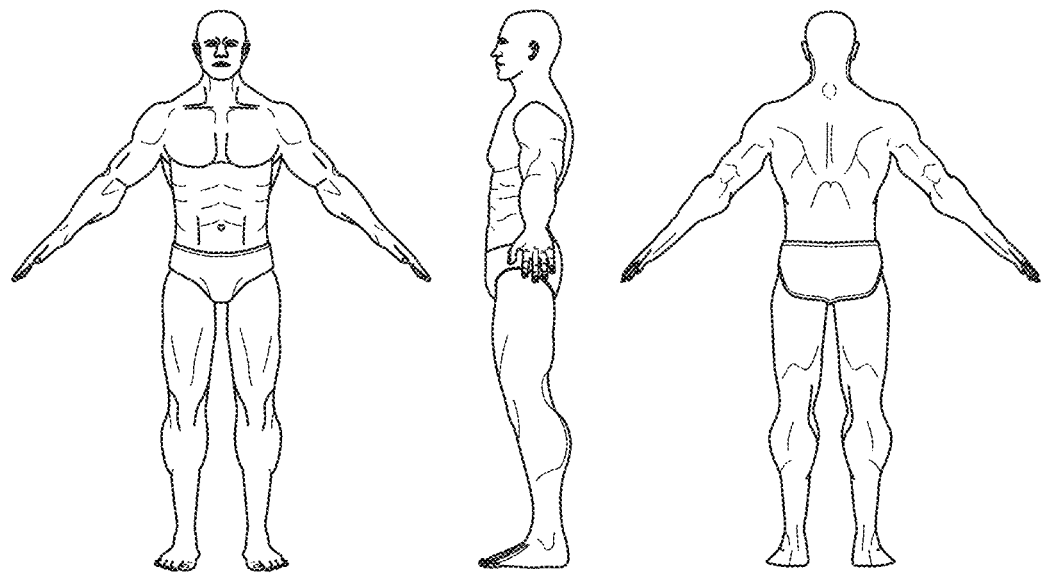
FIG. 9 is a schematic of an exemplary embodiment of a method of learning and recognizing features of an image of a user's body in accordance with the present disclosure.
Figure 9:
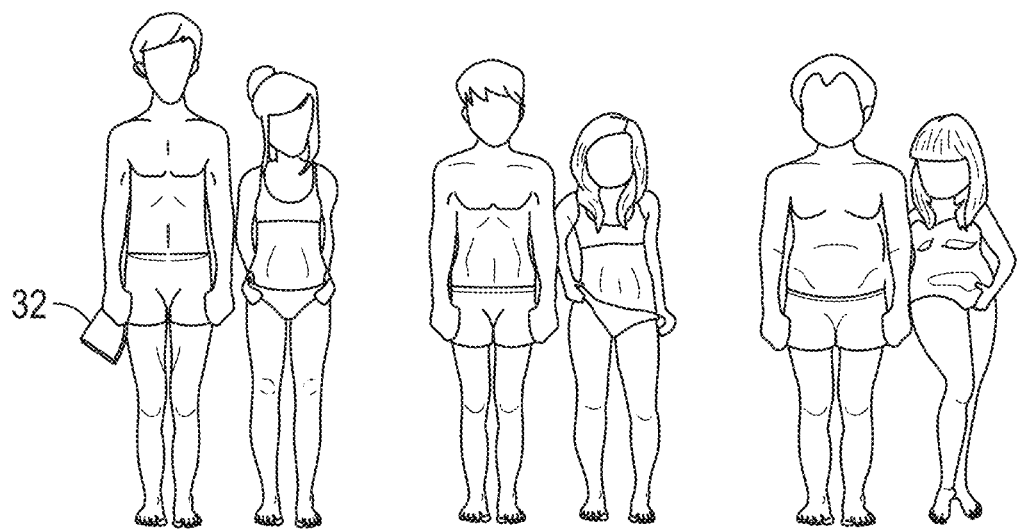
Figure 10:
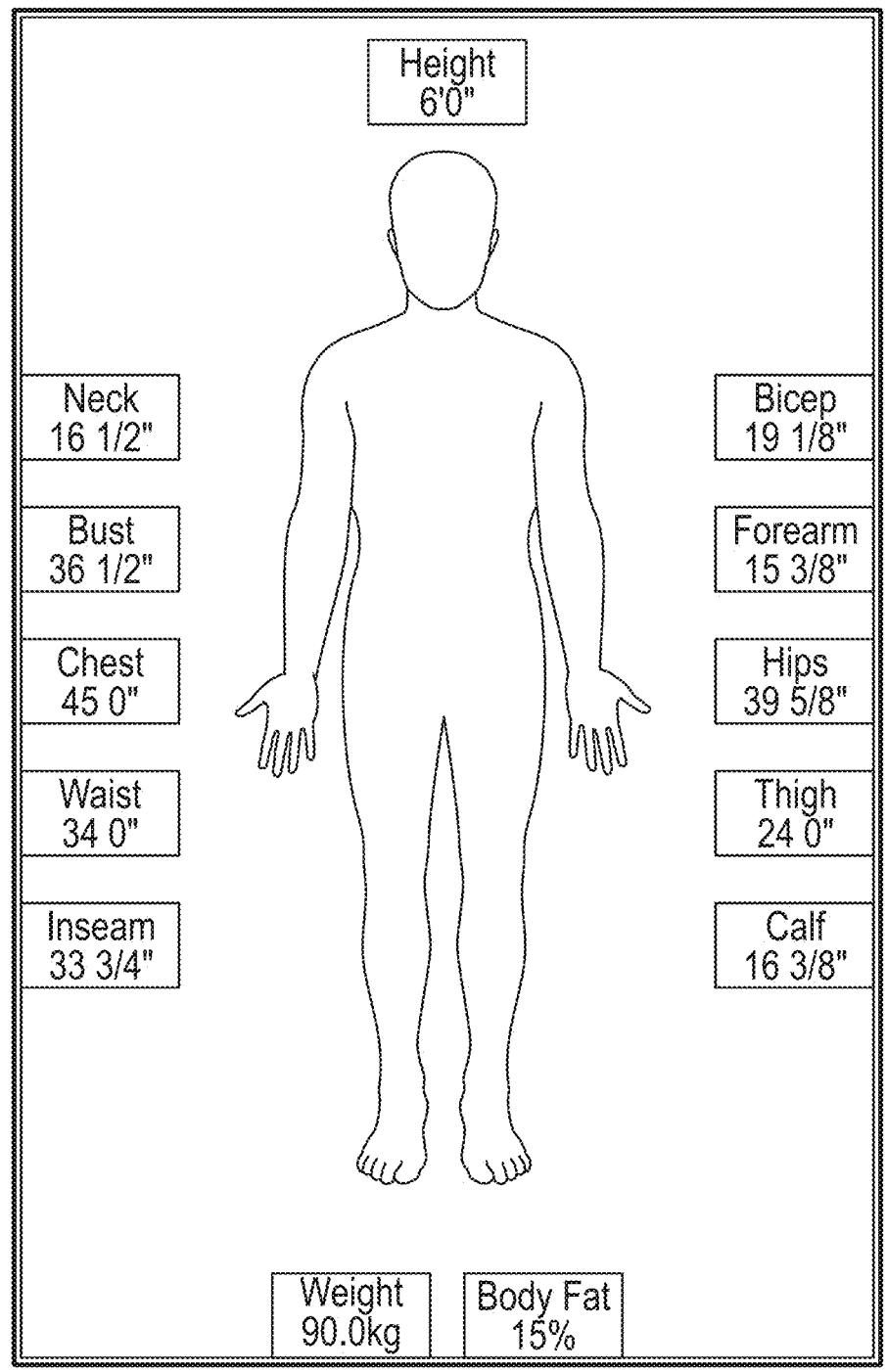
FIG. 10 is a schematic of an exemplary embodiment of a method of learning and recognizing features of an image of a user's body in accordance with the present disclosure.

In operation, the user trains the system to identify his or her face by holding the mobile device 32 in front of his or her face once, as best seen in FIGS. 7 and 8 and taking a picture using the camera 222 in the device. As shown in FIGS. 9 and 10, the user may also train the system to identify his body by holding the mobile device 32 in front of his body. As discussed above, exemplary processes include identifying specific points 12 in the image of the face and/or body where there are two-dimensional changes 14 such as corners, junctions, vertices, etc. and/or other points of interest 112.

Figure 11A:
FIG. 11A is a front view of an exemplary embodiment of a method of recognizing features of a partially covered image of a user's face in accordance with the present disclosure.
Figure 11B:
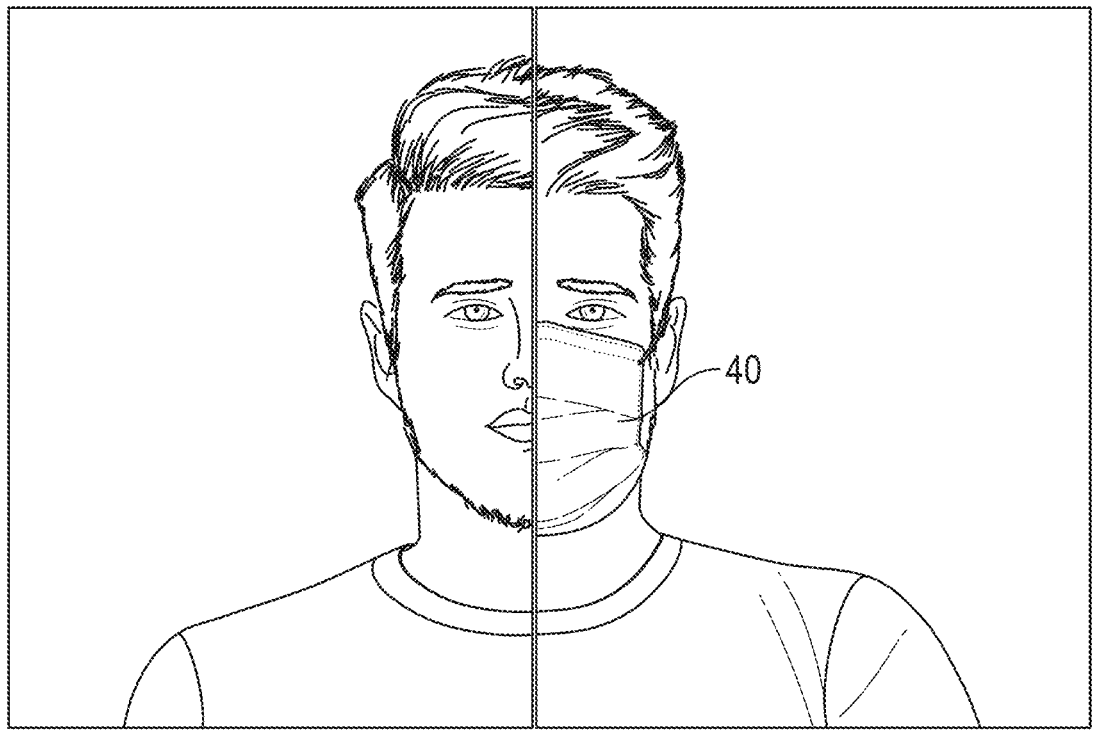
FIG. 11B is a front view of an exemplary embodiment of a method of recognizing features of a partially covered image of a user's face in accordance with the present disclosure.

Another process step may include overlaying a mesh 16 on the image 8, 108 of the face and/or body and analyzing geometric features 15 on the mesh. The process next performs the steps of transforming data from the identified points 12 and points of interest 112 and the geometric feature analysis into a three-dimensional point FIG. 120 of the face and/or body image 8, 108, determining a final shape of the image, and in some embodiments, constructing a three-dimensional object model 108 of the face and/or body. As shown in FIGS. 11A-11B, after these steps, the user's face can be identified and recognized with or without a covering 40 obscuring it. Similarly, the user's body can be recognized with the user wearing any type of clothing.

Figure 12:
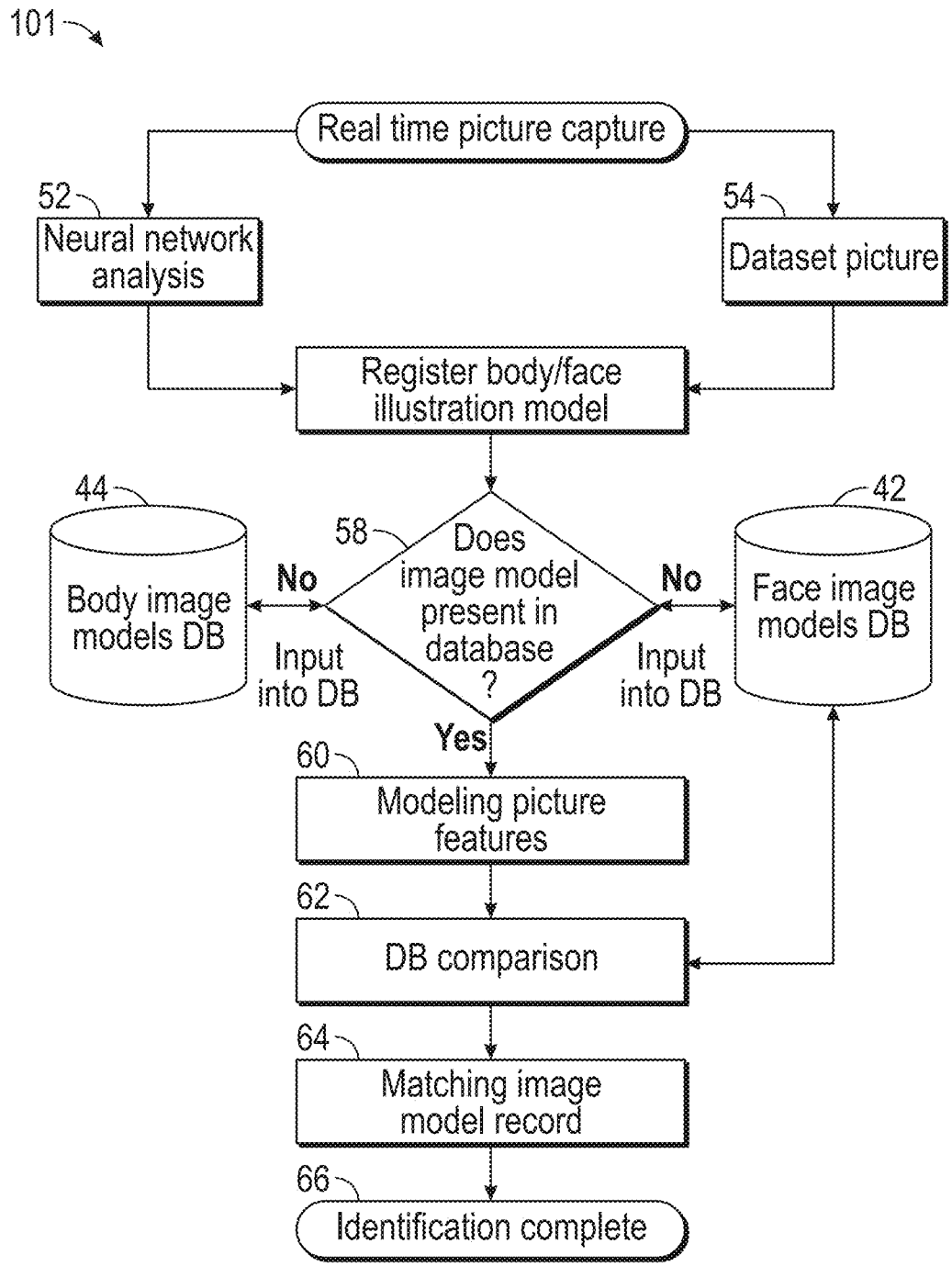
FIG. 12 is a schematic diagram of an exemplary embodiment of an artificial intelligence system in accordance with the present disclosure.

With reference to FIG. 12, in exemplary embodiments incorporating AI-based computer vision analysis, proprietary image recognition processes are utilized. An overview of an exemplary AI system is illustrated in FIG. 12. The process of real time picture capture 101 includes neural network analysis 52 and use of a dataset picture 54. Registering 56 of the body and/or face illustration model is followed by the query 58 whether the image model presents in the face image models database 42 and/or body image models database 44. If no, the body or face image is input into its respective database. If yes, then the process proceeds to the modeling picture features step 60. A database comparison 62 is performed, and if there is matching 64 of the image model record, the identification is complete 66.

In exemplary embodiments, an expert system provides ratios and relations analysis between unique key pointers in a human face and body. Pictures that are taken without mask/clothing are mapped by the expert system to identify vectorials based on key features' relations and ratios. The expert system uses the neural network data and identifies unique key facial and body points of interest. These unique features are mapped as 2D and 3D databases to be later used as key identifiers to identify people with face or body coverings. The expert system can compute physical relations and ratios of unique facial and body features like distances, e.g., the distance between the nose and mouth on the right side of the face relative to the distance between the nose and mouth on the left side of the face, depth level, e.g., the depth between the left eye relative to the depth of the right eye. The expert system input is the neural network data and the output is a vectorial map of unique, out of the ordinary, or stick-out facial and body features. The process can be done for all facial and body views. The more views provided, the better results can be achieved. The facial and body views are front, back, and sides.

Turning to FIGS. 13-19, exemplary image pixelation methods will be described. The image pixelation process 201 includes not only facial/body detection 202 but also classifier training 205. If the body is detected 207, the body features are recorded. If the body is not detected, the facial body detection step 202 may be repeated. The process will also attempt to detect 211 the user's face. If the face is not detected, the facial body detection step 202 may be repeated. When the face is detected 211, the process engages in deep learning 213, which could be for the body and/or the face.

Figure 19:
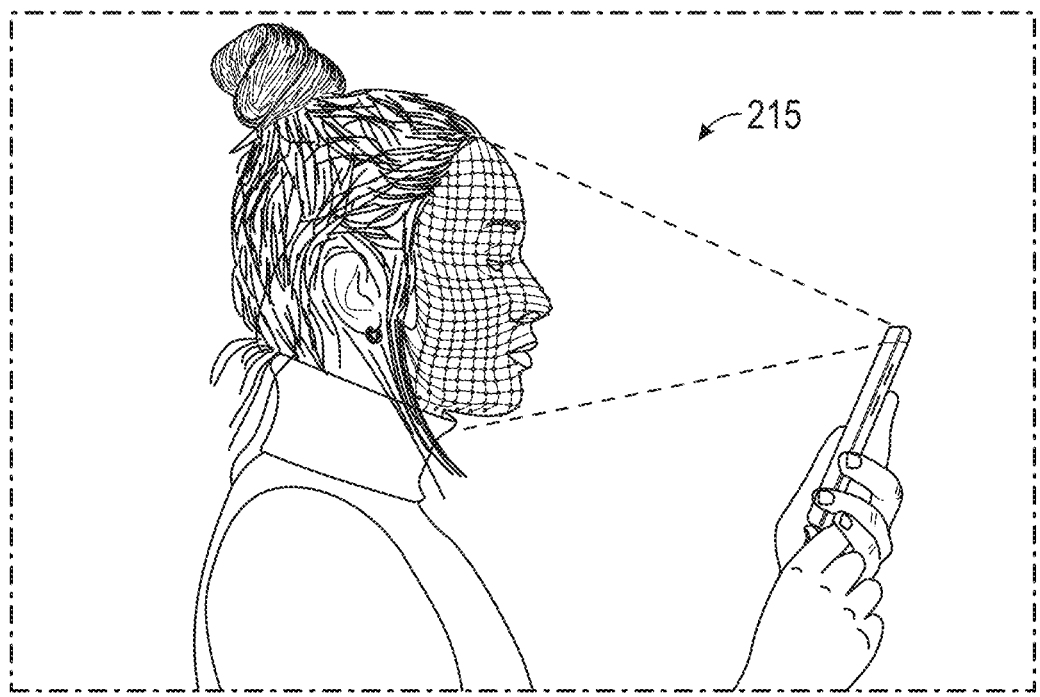
FIG. 19 is a perspective view of an exemplary embodiment of a system and method of learning and recognizing features of an image using vectorization and deep learning in accordance with the present disclosure.

Body and/or face vectorization 215 may then be performed, a function illustrated in more detail in FIG. 19. The calibrators 18 contribute to this part of the process and may assist in transforming image data into a three-dimensional point figure of the image. As discussed above, point detectors 10 generate key points in the image where there are two-dimensional changes, and geometric feature evaluators 6 analyze geometric features on a mesh overlayed on the image. Then, using the key points and geometric feature analysis, depth evaluators 22 determine the final shape of the image and the recognition process is completed 219. The process may include recognition training 217 based on the deep learning, vectorization and point detection functions.

Figure 14:
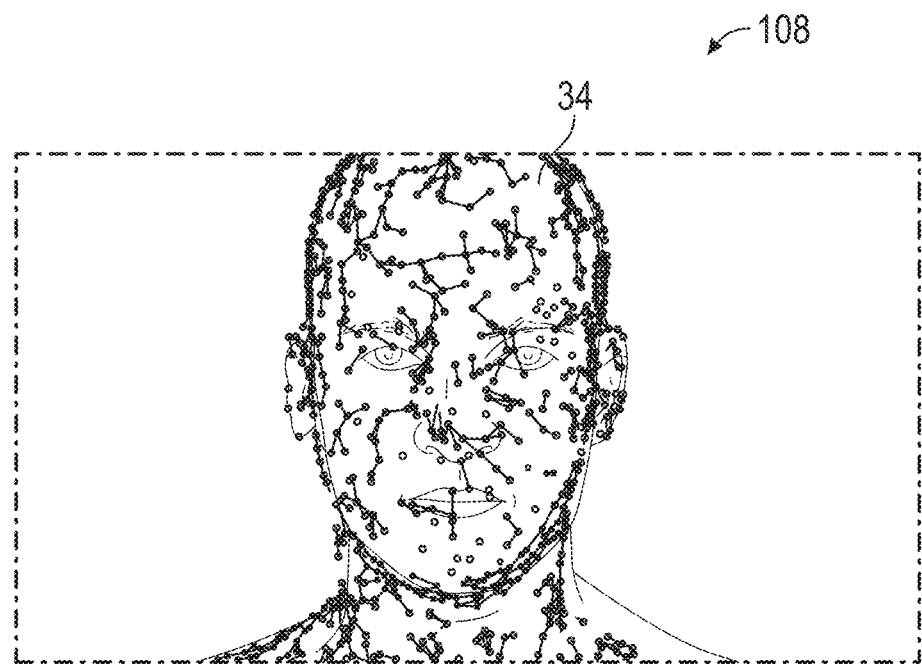
FIG. 14 is a schematic of an exemplary embodiment of a method of learning and recognizing features of an image using pixelation and AI-based computer vision analysis in accordance with the present disclosure.
Figure 15:
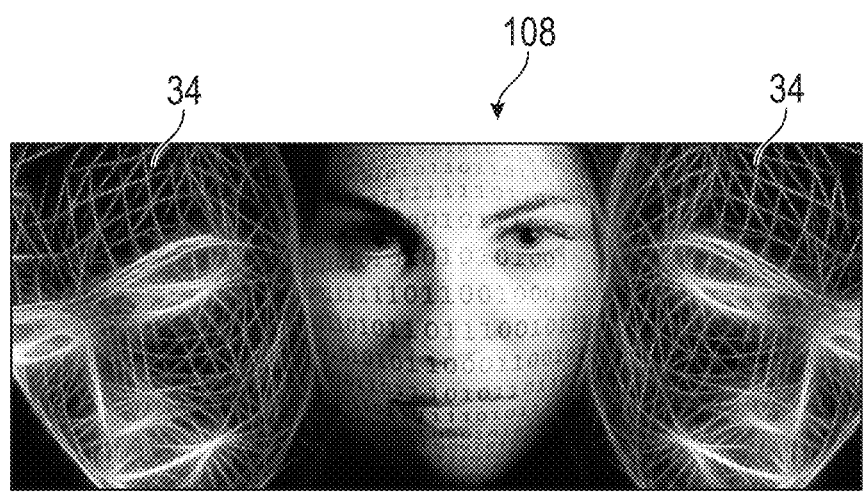
FIG. 15 is a schematic of an exemplary embodiment of a method of learning and recognizing features of an image using pixelation and AI-based computer vision analysis in accordance with the present disclosure.
Figure 16:
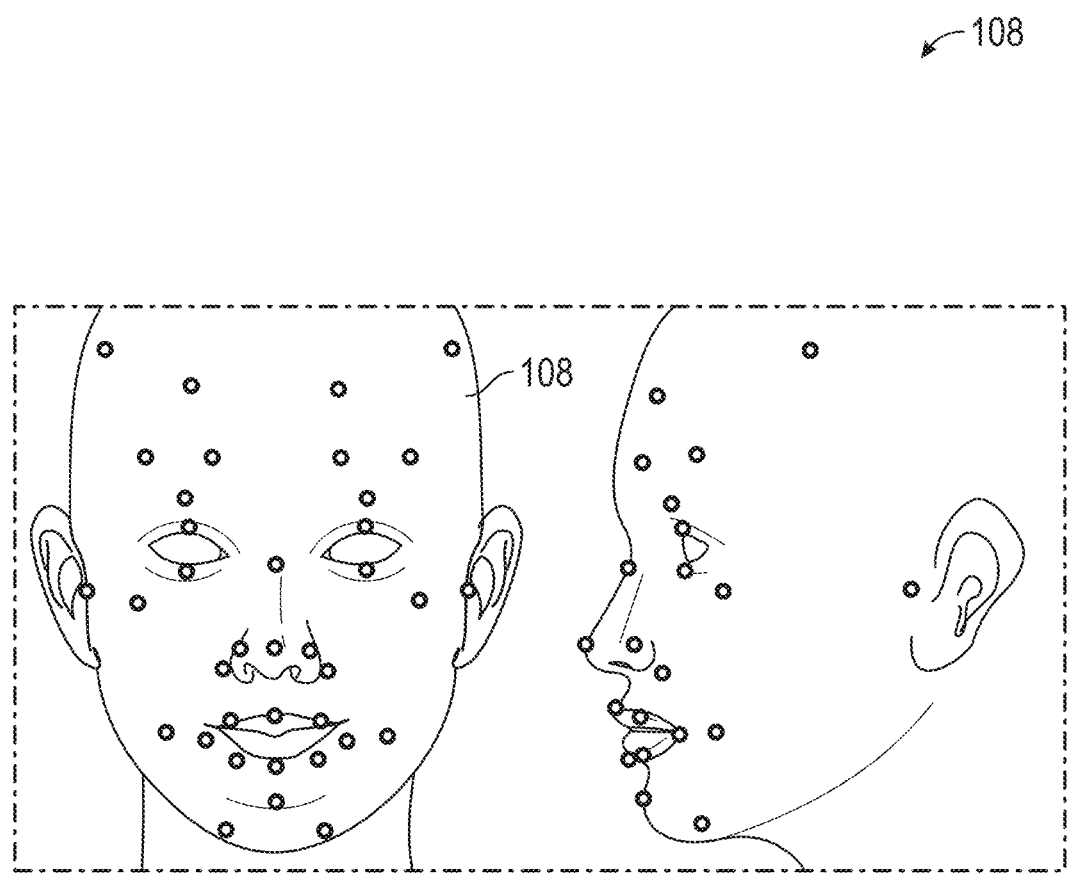
FIG. 16 is a schematic of an exemplary embodiment of a method of learning and recognizing features of an image using AI-based computer vision analysis in accordance with the present disclosure
Figure 17:
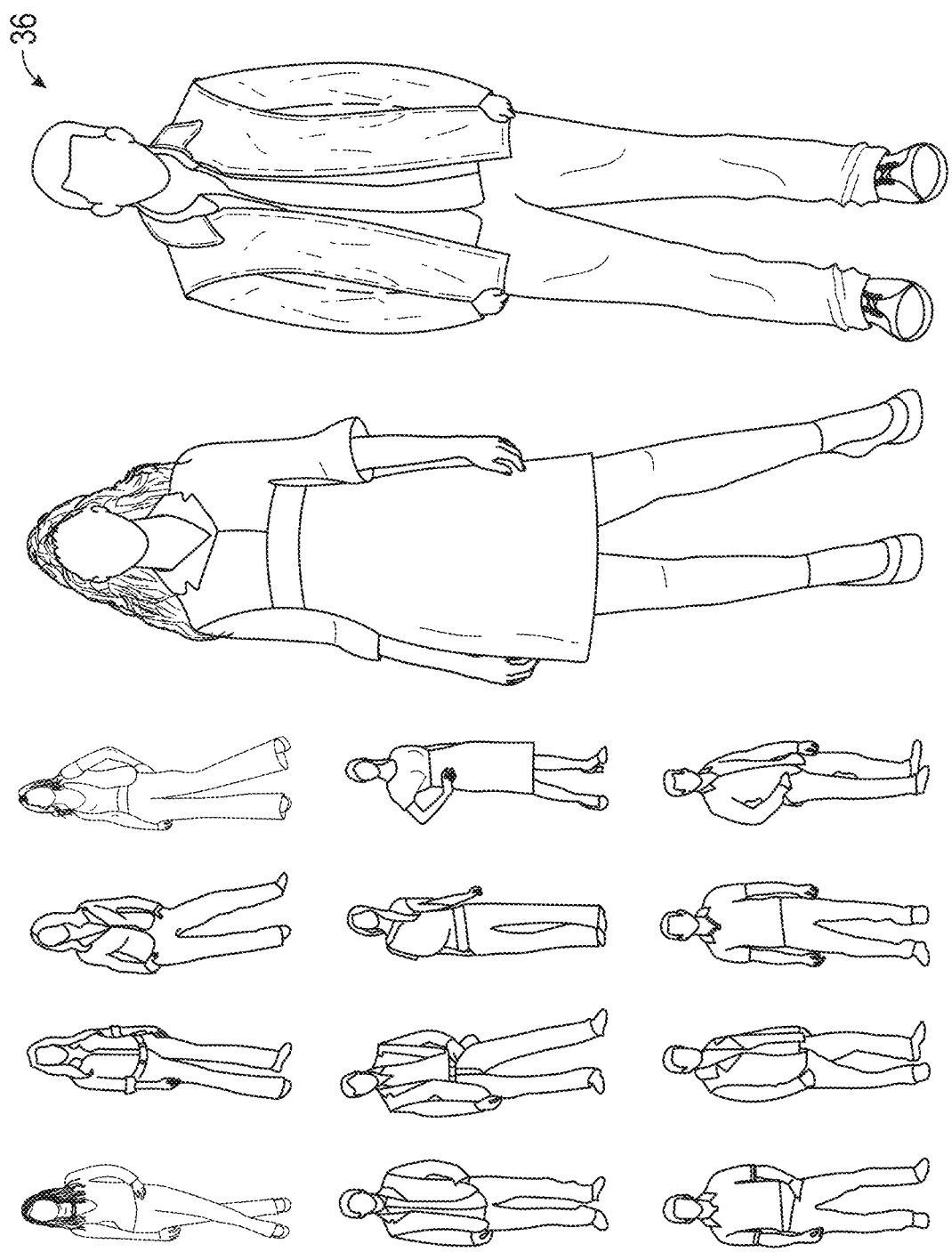
FIG. 17 is a schematic of an exemplary embodiment of a method of learning and recognizing features of an image using AI-based computer vision analysis in accordance with the present disclosure.
Figure 18:
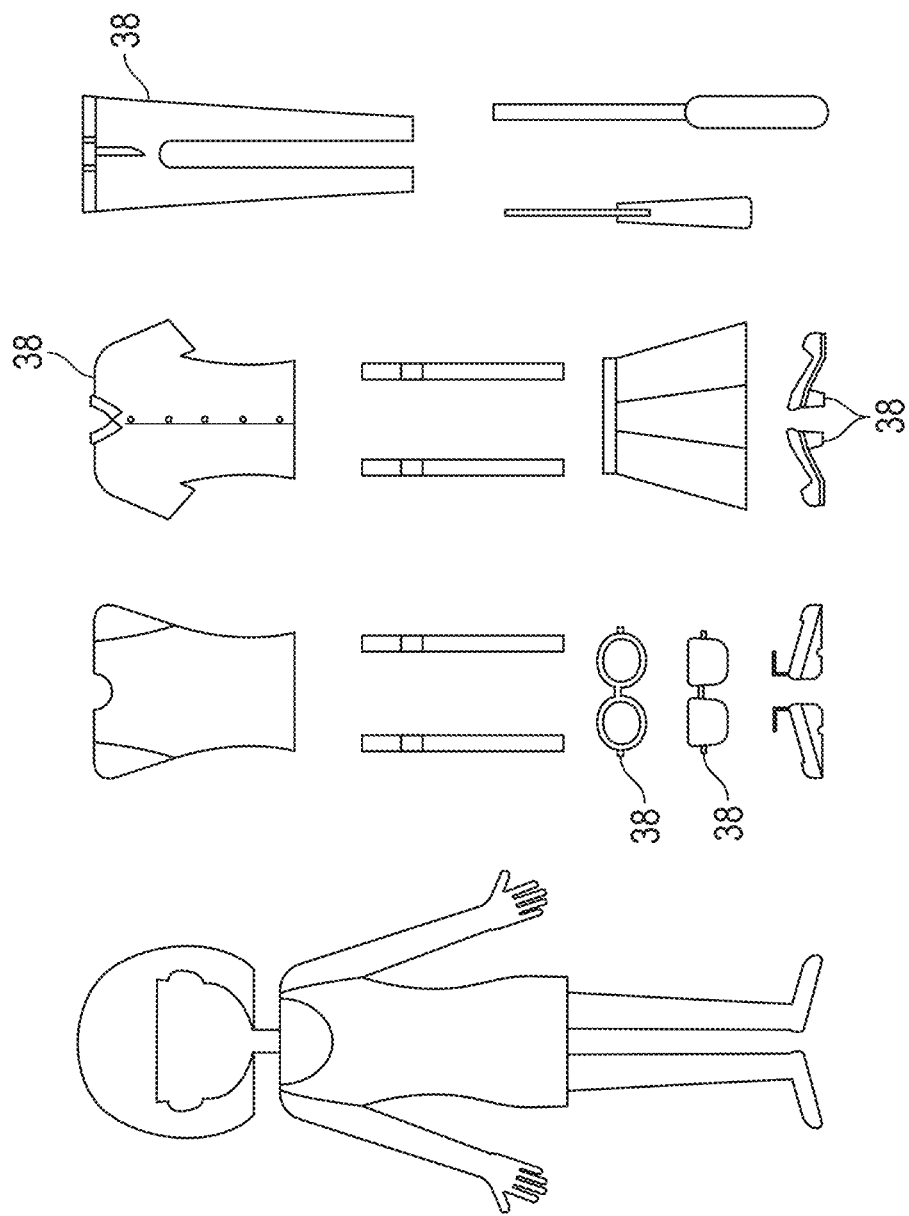
FIG. 18 is a schematic of an exemplary embodiment of a method of learning and recognizing features of an image using AI-based computer vision analysis in accordance with the present disclosure.

In a first phase of AI analysis, illustrated in FIG. 14, high resolution, pixelation-based facial mapping is performed using a neural network 34 and associate neural network analysis 52. A second phase shown in FIG. 3 may perform low resolution, pixelation-based facial mapping using the neural network. In a third phase, portrait wide facial mapping is performed using the neural network 34, as shown in FIG. 15. As illustrated in FIG. 16, exemplary methods may perform sideways facial mapping using an expert system in phase four of the analysis. In phase five, shown in FIG. 4, biometric facial mapping is done using the expert system. Phase six may comprise a human body style study 36 based on AI vector mapping, as illustrated in FIG. 17. Finally, referring to FIG. 18, in phase seven the analysis may include the step of identifying the clothing and accessories 38 of the user based on AI vector mapping. The user can be identified with or without clothing. If the user so desires, he or she can use the AI analysis to detect changes in her body and provide health alerts in the event of body changes indicating health problems.

Thus, it is seen that systems and methods for learning and recognizing features of an image such as a human face and/or body are provided. It should be understood that any of the foregoing configurations and specialized components or connections may be interchangeably used with any of the systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the present disclosure.

What is claimed is:

1. A system for learning and recognizing features of an image, comprising:
    at least one point detector identifying points in an image where there are two-dimensional changes including one or more of: corners, junctions, and vertices;
    at least one geometric feature evaluator overlaying at least one mesh on the image and analyzing geometric features on the at least one mesh;
    at least one internal calibrator transforming data from the point detector and the geometric feature evaluator into a three-dimensional point figure of the image;
    at least one depth evaluator determining a final shape of the image;
    an artificial intelligence unit configured to learn a user's facial and body features;
    a neural network providing data and performing image pixelation including high resolution pixelation-based facial mapping, low resolution pixelation-based facial mapping, and classifier training; and
    an expert system having as its input the data from the neural network and being configured to read the data from the neural network and identify unique features of a user's face or body and map the unique features into a database.

2. The system of claim 1 wherein the image is of a human face or human body.

3. The system of claim 1 wherein the point detector and the geometric feature evaluator identify points based on geodesic distance between vertices in the mesh.

4. The system of claim 1 wherein the geometric feature evaluator uses stereo vision.

5. The system of claim 1 wherein the system is housed in a mobile device and is configured to lock or unlock the mobile device upon identification of the user's facial or body features.

6. The system of claim 1 wherein the expert system computes physical relations and ratios of unique facial and body features comprising one or more of: distance and depth.

7. The system of claim 1 wherein the neural network further performs portrait wide facial mapping.

8. The system of claim 7 wherein the expert system further performs sideways facial mapping.

9. The system of claim 8 wherein the expert system further performs biometric facial mapping.

10. A computer-implemented method of learning and recognizing features of an image, comprising:
    identifying points in an image where there are two-dimensional changes;
    overlaying at least one mesh on the image and analyzing geometric features on the at least one mesh;
    transforming data relating to the points and geometric features into a three-dimensional point figure of the image;
    determining a final shape of the image;
    providing data from a neural network as input to an expert system, the expert system reading the data from the neural network, identifying unique features of a user's face or body, and mapping the unique features into a database;
    performing image pixelation including high resolution pixelation-based facial mapping and low resolution pixelation-based facial mapping; and
    constructing a three-dimensional object model of the image from a partial view of the image.

11. The method of claim 10 wherein the image is of a human face or body and further comprising learning features of a user's face or body.

12. The method of claim 11 further comprising identifying the features of the human face and unlocking a mobile device based on recognition of the features of the user's face.

13. The method of claim 11 wherein the learning is performed based on a partial view of the user's face.

14. The method of claim 12 wherein the recognition and unlocking are performed based on a partial view of the features of the user's face.

15. The method of claim 10 further comprising storing as a reference data relating to the features of the user's face.

* * * * *